United States Patent [19]
Leonard

[11] 3,723,007
[45] Mar. 27, 1973

[54] REMOTE QUANTITATIVE ANALYSIS OF MATERIALS

[75] Inventor: Donald A. Leonard, Stoneham, Mass.

[73] Assignee: Avco Corporation, Cincinnati, Ohio

[22] Filed: Jan. 22, 1971

[21] Appl. No.: 108,710

[52] U.S. Cl. ...................356/75, 252/300, 350/312
[51] Int. Cl. ...............................................G01j 3/44
[58] Field of Search ..........356/75; 350/312; 252/300

[56] References Cited

UNITED STATES PATENTS

| | | | |
|---|---|---|---|
| 3,625,613 | 12/1971 | Abell et al. | 356/75 |
| 3,528,740 | 9/1970 | Gerry et al. | 356/75 X |

OTHER PUBLICATIONS

Hirschfeld et al. "Proceedings of the Technical Program of the Electro-Optical Systems Design Conference", Sept. 16-18, 1969, pages 418-427

Damen et al. "Physical Review Letters", Vol. 14, No. 1, January 4, 1965 pages 9-11
Barrett et al. "Journal of the Optical Society of American", Vol. 58, No. 3, March 1968 pages 311-319

Primary Examiner—William L. Sikes
Assistant Examiner—F. L. Evans
Attorney—Charles M. Hogan and Melvin E. Frederick

[57] ABSTRACT

The remote quantitative analysis of a material and the range of the material are determined from the Raman scattered radiation from the material, such as for example, a gas where the gas is subjected to intense pulses of laser radiation launched from a remote location. The scattered radiation is filtered to selectively attenuate reflected radiation from the source and transmit the Raman scattered radiation to a detector system which integrates the detected radiation over an interval spaced in time from a laser pulse whereby the spacing represents range to the gas and the integral represents the concentration of a particular species in the gas.

3 Claims, 8 Drawing Figures

Fig. 1

LIQUID FILTER CHARACTERISTICS

Fig. 2

DONALD A. LEONARD
INVENTOR.

BY Charles M. Hogan
Melvin E. Frederick
ATTORNEYS

DONALD A. LEONARD
INVENTOR.

BY Charles M. Hogan
Melvin E. Frederick
ATTORNEYS

DONALD A. LEONARD
INVENTOR.

REMOTE QUANTITATIVE ANALYSIS OF MATERIALS

This invention relates to apparatus for remotely analyzing materials and more particularly to apparatus for remotely analyzing gaseous materials and determining the range thereto and the component gases thereof.

Remote sensing of gases in a gaseous effluent discharged into the atmosphere is described in U.S. Pat. No. 3,625,613 which is assigned to the same assignee as the present invention. That application describes a system which directs pulses of intense laser radiation from a remote transmitter location to the gas effluent. Back-scattered radiation from the gas is detected and analyzed remotely to identify at least a few of the gas components of the effluent. The back-scattering is Raman scattering and so exhibits Raman-shifted wavelengths which are characteristic of different gases. Selection of the scattered radiation by wavelength at a receiver location and measurement of the intensity of the selected radiation provides an identification of the particular gases and an indication of the relative concentration of each gas in the effluent. In that system, the reflected radiation from the laser which enters the receiver tends to mask the Raman-scattered radiation entering the receiver. This is compensated for in that system by purposely selecting the reflected laser radiation at the receiver and subtracting a weighted signal representing the intensity thereof from the measurements of intensity of the selected Raman-scattered radiation at the receiver. This weighting is empirically determined and so calibration and determination of the weighting for each constituent gas is subject to inaccuracies and approximations. Furthermore, calibration for each constituent gas is accomplished with reliability only by testing with each particular constituent in known concentration at a known range from the transmitter and receiver.

It is an object of the present invention to provide such a system for remote monitoring wherein masking of Raman scattered radiation by reflected laser radiation at the receiver is avoided.

It is another object to provide in such a remote monitoring system means at the receiver for blocking radiation of the laser radiation wavelength without substantially attenuating the Raman scattered radiation at the receiver.

It is another object to provide an improved calibration standard for such a system which preferably is intrinsic to the system.

It is another object that the calibration standard vary with range in true representation of the effects of range on the intensity of Raman scattered radiation at the receiver.

It is another object that the calibration standard vary with atmospheric conditions in the path of the laser and the scattered radiation is a true representation of the effect of such conditions on the intensity of the Raman scattered radiation at the receiver.

Remote monitoring of a gaseous effluent and particularly a polluting effluent has among its purposes to identify the polluting gas constituents and their concentrations in the effluent and also determine the location of the effluent. Toward this end, the elevation, azimuth and range to the effluent relative to the known location of the transmitter identifies the location of the pollution. Elevation and azimuth clearly define the direction of the pulsed laser beam. Range determination is less apparent. Accordingly, it is another object of the present invention to provide such a remote monitoring system which provides within the basic system parameters for determining range to the gases which produce the Raman scattered radiation that enters the receiver.

It is a further object to provide such a remote monitoring system wherein there is produced at the receiver location sets of signals arranged as to range and gas constituents.

It is another object to provide such sets of signals following each laser pulse.

In accordance with features of the present invention, intense pulses of laser radiation may be directed to a gaseous target, such as, for example, combustion products, water vapor in the atmosphere, effluent from industrial processes and the like, producing therefrom backscattered Raman radiation which is intercepted by a receiver preferably at the same location as the source of the laser pulses. At the receiver, the radiation is filtered to block, and thereby separate, reflected laser radiation from the Raman back-scattered radiation which is separated by wavelength, detected and integrated over intervals separated in time from the laser pulse which produces the backscattering. Each integral is representative of the concentration of a given gas constituent and the time separation is representation of the range to the effluent.

The present invention may also be used to quantitatively analyze liquids and solids at locations remote from the laser source, such as, for example, remote determination of temperature, salinity or impurity levels in water or solid particulates suspended in a medium.

Other objects and features of the invention are apparent from the following specific descriptions of embodiments representing the best uses of the invention described in conjunction with the Figures in which.

When, for example, atmospheric gas species (constituents) are irradiated by laser radiation, a Raman wavelength shift occurs with the resultant spectral lines being specific to the molecular species intercepting the laser beam. Thus, the Raman shifted wavelength distinguishes each gas constituent and the shifted wavelengths can be distinguished from the more intense laser beam reflection and Rayleigh scattering which does not shift wavelength. The Raman scattering technique as applied herein to remote gas monitoring enables a range resolved measurement of atmospheric constituents with respect to both species and concentrations, all from a remote location.

Although other lasers may be used, the laser used in embodiments of the present invention is a 3,371A ultraviolet pulsed nitrogen laser referred to as a master oscillator power amplifier (MOPA). In the MOPA a small pulsed nitrogen laser is used as an oscillator to provide relatively low peak power pulses, about 10 KW peak power. The beam from the oscillator is passed through a mode control spatial filter producing a beam of very low divergence. This beam is amplified in a second larger laser unit which is pumped in synchronism with the oscillator to within one nanosecond.

Figure 1:
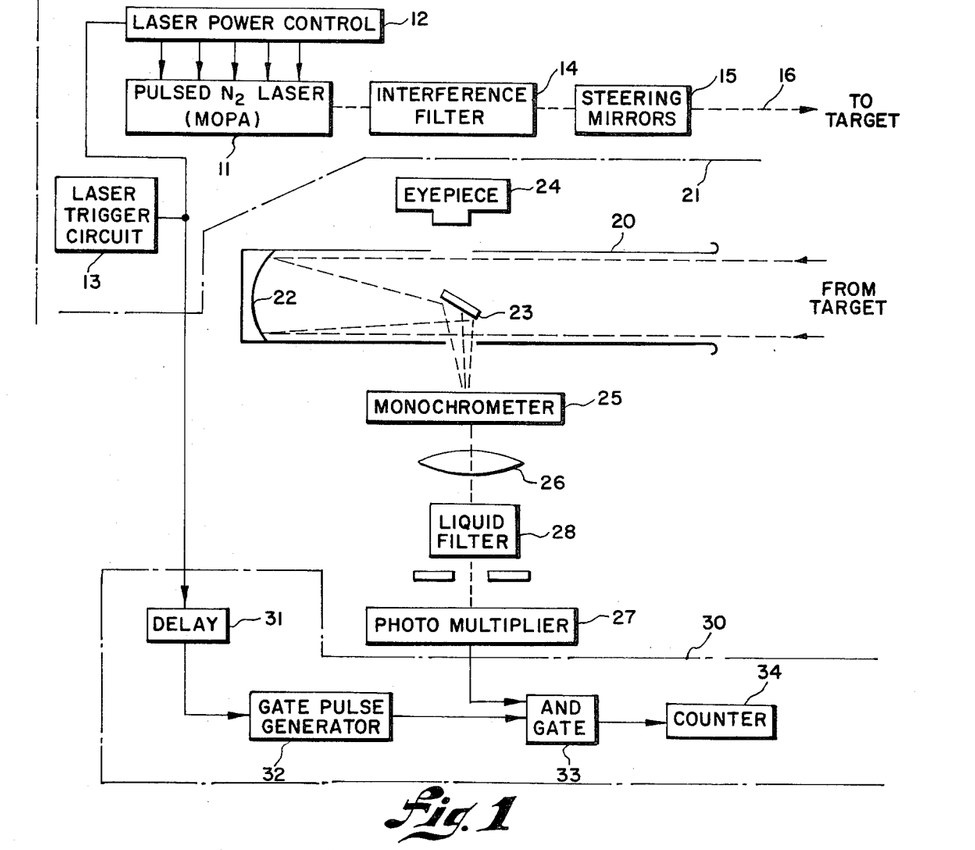
FIG. 1 is a schematic and block diagram of an embodiment of a remote gas monitoring system for determining the concentration of a specific gas constituent at a specific range.

The output of the MOPA is passed through an interference filter designed to pass a narrow line, the 3371A line and block spontaneous emission lines from the nitrogen discharge. The MOPA laser is shown in FIG. 1 and indicated generally by the numeral 10. This laser includes the oscillator and amplifier 11, power source 12 and laser trigger circuit 13. The trigger initiates laser pulses at a repetition rate of 100 pps each of 10 nanosecond duration. The laser beam 16 is filtered by an interference filter 14 which passes the narrow line 3,371A. Steering mirrors 15 give fine direction control of the pulses 16 emanating from the laser and serve to steer the beam and position it within the field of view of telescope 20 at the range of interest.

The telescope 20 provides the entrance to the receiver system denoted generally by the numeral 21. The telescope is a Newtonian type which includes a 10 inch mirror 22 having a 60 inch focal length. The focal steering mirror 23 in the telescope directs entering radiation to the eyepiece 24 or to monochrometer 25. The eyepiece is used to sight the telescope on the target. The monochrometer may be a Jarrel-Ash ¼ meter monochrometer having a resolution of 17A per millimeter. It transmits about 20 percent in the ultraviolet and rejects stray light in the ratio about $10^{-3}$.

A lens 26 at the exit slit of the monochrometer focuses the exit slit on the field stop of photomultiplier 27. Between the monochrometer 25 and photomultiplier is a filter 28 which blocks the remainder of the 3,371A radiation passed by the monochrometer 25 but passes the Raman shifted radiation characteristic of the gas species under observation. The filter 28 may be disposed substantially anywhere in the receiver optical path. One suitable filter for this purpose is a liquid filter which is a quartz walled cell containing a water solution of 2,7 - dimethyl - 3,6 - diazacyclohepta - 1,6 - diene perchlorate. This has the property of essentially complete isotropic volume bulk absorption of 3,371A radiation but is nearly completely transparent to wavelengths of 3,500A and longer. The purpose of the filter is to block the 3,371A radiation from the laser which is reflected from the target gas (this may be a smoke plume) and which the monochrometer is not able to reject fully.

Figure 2:
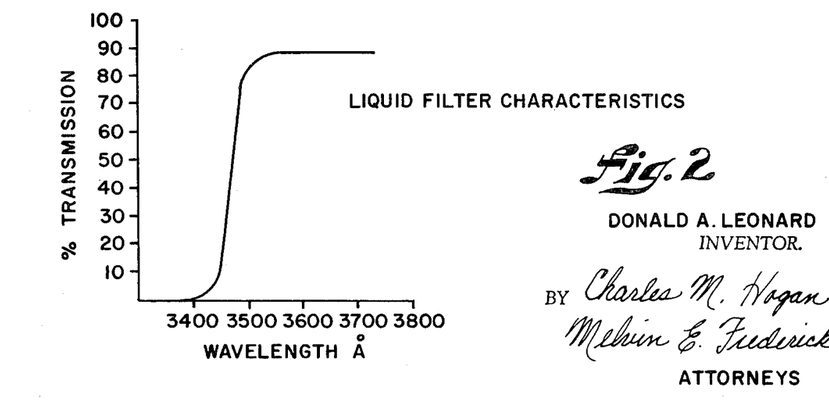
FIG. 2 is a plot of received radiation filter transmission vs. wavelength showing negligible transmission of reflected laser radiation wavelength.

FIG. 2 shows the filter's characteristics, transmission vs. wavelength. As can be seen, transmission above 3,500A is better than 80 percent while below 3,400A it is virtually zero. This particular water solution defined above is a simple cyclic Cyanine-like dye. Similar filters and their formulations are discussed in an article entitled "Transmission Filters for the Ultraviolet" by M. Kasha, *Journal of the Optical Society of America*, Vol. 38, No. 11. Filters in accordance with the present invention are preferred as their transmission characteristics are far superior to commercially available interference filters.

Figure 5:
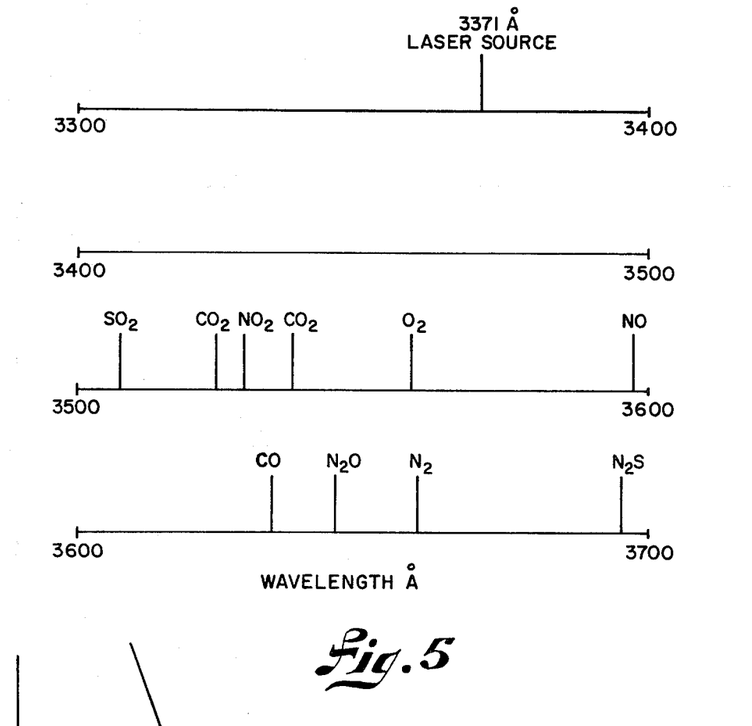
FIG. 5 is a scale showing Raman scattered wavelengths for gas species of interest in air pollution when incident laser radiation is from a pulsed nitrogen laser of wavelength 3,371A.
Figure 7:
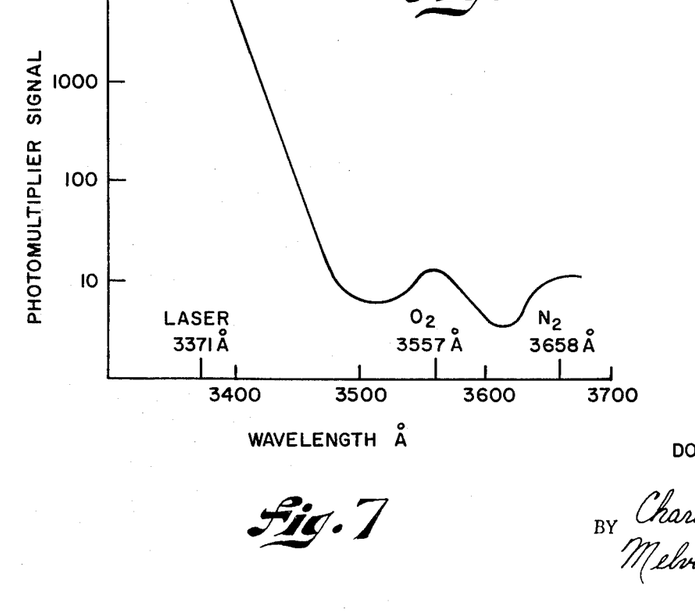
FIG. 7 is a plot of the receiver backscatter detector (photomultiplier) output versus wavelength for air subjected to the nitrogen laser radiation at 3,371A and showing the Raman scattered radiation from $O_2$ and $N_2$ at their characteristic Raman shifted wavelength.

The effectiveness of the filter with characteristics shown in FIG. 2 is more fully understood by considering the spectrum of Raman shifted scattered radiation from the gas species likely present in a plume of polluting gas effluent. FIG. 5 shows the spectrum of Raman shifted radiation for a number of gas species illuminated by 3,371A laser radiation. This includes $O_2$ and $N_2$ which of course are present in all atmospheric discharges. The relative intensities of backscattered 3,371A radiation and Raman shifted scattering from $O_2$ and $N_2$ in the atmosphere are shown by the plot in FIG. 7. The plot is photomultiplier output vs. wavelength. The scattering from $O_2$ and $N_2$ at 3,557A and 3,658A, respectively, are weaker by more than three orders of magnitude than the backscattered 3,371A. This illustrates the desirability of selectively blocking the 3,371A radiation at the receiver.

The resolution of the monochrometer determines the resolution of the various Raman scattered lines from different gas species and so it determines the resolution between gas species. Use of the water filter of the types described herein having characteristics such as shown in FIG. 2 permits the use of inexpensive monochrometers that need only be able to discriminate between the various Raman lines. A typical dark current counting rate is 200 counts per second. However, when the output of the photomultiplier is gated with 100 nanosecond gate pulses at the rate of 100 pulses per second, the dark current count is less than $2 \times 10^{-3}$ per second. This illustrates the significant reduction in dark current count that can be achieved by gating the output of the photomultiplier so that the output represents only the Raman scattered radiation from a given gas species at a given range from the laser. Ranging is intrinsic in such a gate procedure, because, in effect, it looks at the receiver output at an interval which must relate to the laser pulse interval as a range interval. If the gate pulse interval is coincident with the laser pulse interval, then the range is zero. If it is delayed 100 nanoseconds, after the laser pulse then the range is 50 feet and so forth. Thus, the effect of gating the output of the photomultiplier 27 is two fold; it substantially reduces dark current pulses from the photomultiplier and it limits the output to a specific range. For these purposes, the output of the photomultiplier which consists of electrical pulses representing incident photons of the Raman scattered radiation is gated and counted by the electronic circuit designated generally by the numeral 30. This circuit responds to a trigger signal from the laser trigger circuit 13. The trigger signals are delayed by delay 31 which determines the range and feed to gate pulse generator 32 which shapes the triggers into, for example, 100 nanosecond long gate pulses. These gate pulses are applied along with the output of the photomultiplier 27 to AND circuit 33, the output of which triggers the counter 34. Thus, the counter produces a count number during the interval of a gate pulse which is indicative of the relative concentration of a particular gas species at the target, the target being designated by the direction of the laser beam and the range as determined by delay 31.

Figure 3:
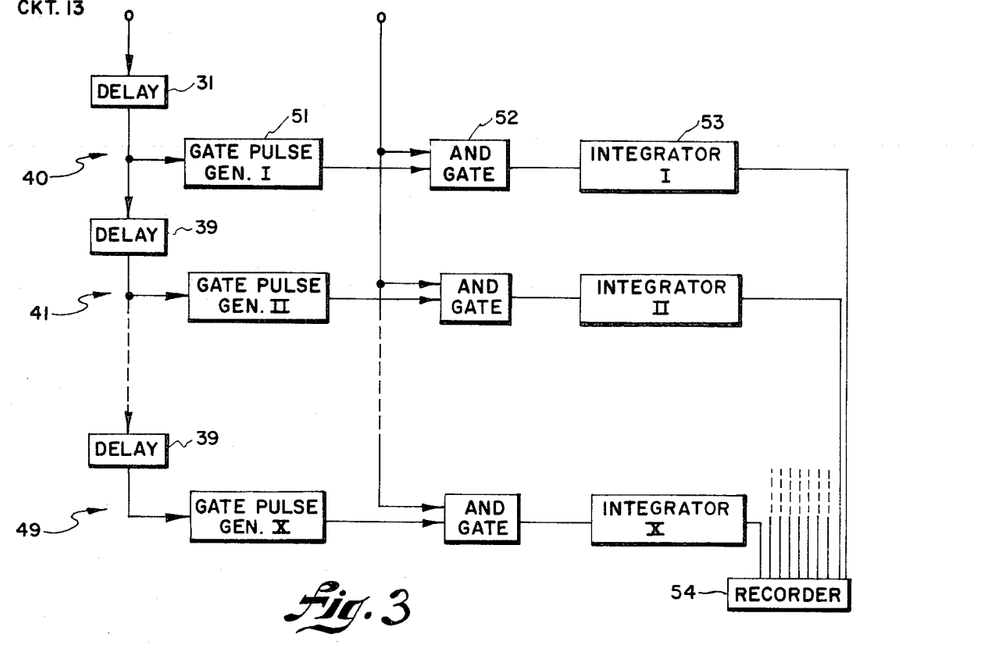
FIG. 3 is a schematic and block diagram of another embodiment for rapidly determining the concentrations of a specific gas constituent at a plurality of ranges.

The same optical system shown in FIG. 1 and described above can be equipped with electronics to produce a multi-channel receiver which produces outputs representing the concentration of a particular gas species at a multitude of ranges from the laser. Such an electronic system is shown in FIG. 3. Here, the output from the trigger circuit 13 is fed to each of 10 channels denoted 40 to 49 and is delayed between successive channels by, for example, equal delays 39 which may be 50 nanoseconds. Thus, the trigger signal from the laser trigger circuit 13 is fed to the channels 40 to 49, 50 nanoseconds apart over a 500 nanosecond interval for 10 such channels. Each of the channels, such as for example, channel 40 includes a gatepulse generator 51 which responds to the trigger producing, for example, a 30 nanosecond wide gating pulse. This gating pulse is applied to an AND circuit 52 in the channel and the output of the photomultiplier 27 is also fed to the AND circuit 52. Thus, the output of AND circuit 52 consists of pulses of equal amplitude and duration, each representing a pulse output from the photomultiplier during the interval of the 30 nanosecond gate pulse. These are counted or summed by an integrating circuit 53 which may be an analog integrater or a counter. The integrater 53 produces an output signal level which represents the concentration of the particular gas species identified by the monochrometer at the range designated by delay 31. Similarly, the outputs from the channels 41 to 49 are signal levels representing the concentrations of the same gas species at progressive ranges 25 feet apart. These outputs are fed to a recorder 54 for comparison with calibration standards and analysis. One use of such a record is to determine the smoke plume profile with respect to a specific gas species.

Figure 6:
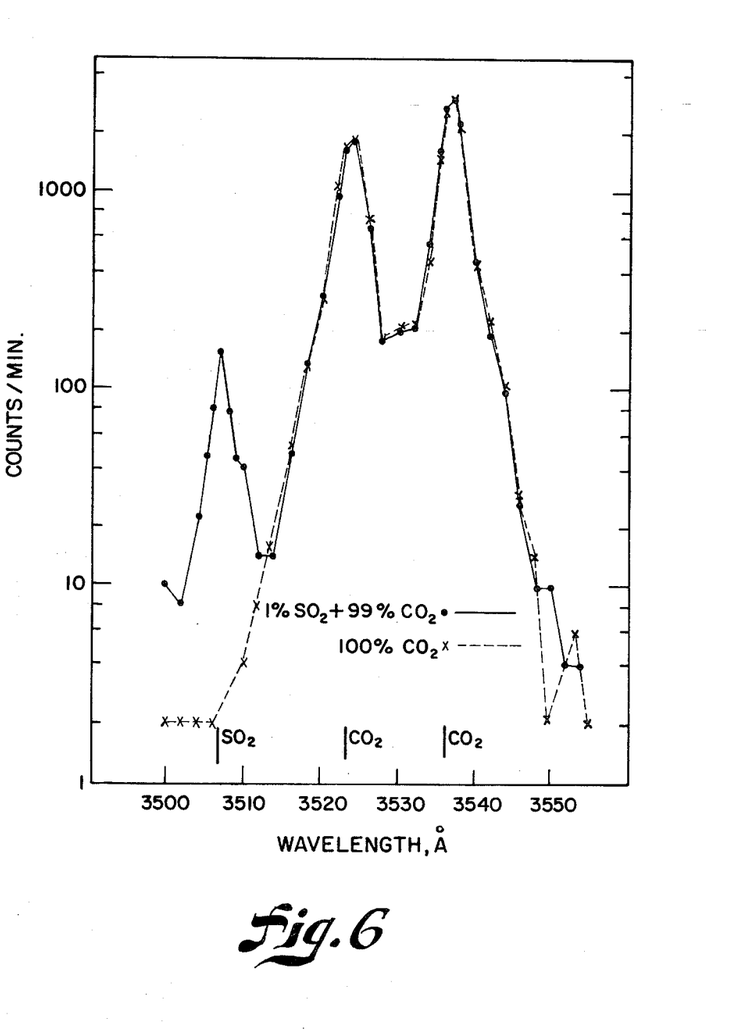
FIG. 6 is a plot of the receiver backscatter detector output versus wavelength for $SO_2$–$CO_2$ mixture subjected to the nitrogen laser radiation at 3,371A and showing the measurement of $SO_2$ in the presence of $CO_2$.

Clearly, the width of the monochrometer output slit can be increased or decreased to thereby correspondingly decrease or increase resolution between Raman scattered radiation lines. If it is increased, then the output from the photomultiplier is greater and if it is decreased, the photomultiplier output is decreased. Careful design and operation of the system permits resolution between Raman scattered lines less than 1A. As can be seen from the spectrum of Raman shifted radiation from a selection of a typical gas species, shown in FIG. 5, the $SO_2$ Raman shifted line is distinct from the $CO_2$ and the NO lines and all of these are distinct from the $O_2$ and the $N_2$ lines. A typical case is the detection of 1 percent $SO_2$ in the presence of 99 percent $CO_2$ which represents a typical combustion fuel sulfur to carbon ratio. FIG. 6 shows Raman data obtained with apparatus in accordance with the invention as shown for example in FIG. 1. As clearly shown in FIG. 6, $SO_2$ is clearly detectable at the 1 percent concentration level. Hence, the system in FIG. 1 or the system in FIG. 3 is useful to identify a specific gas species or at least to distinguish the total concentration of a number of gas species of particular interest in air pollution without including the $O_2$ and $N_2$ which are ever present. In addition, the electronics in FIG. 3 enables the system to determine plume profiles with far less integration time than required with a single channel system having a variable input delay. With the system in FIG. 3, all the interested ranges are examined simultaneously and every laser pulse produces a receive signal indicative of the concentration of the selected species at all the interested ranges.

Figure 4:
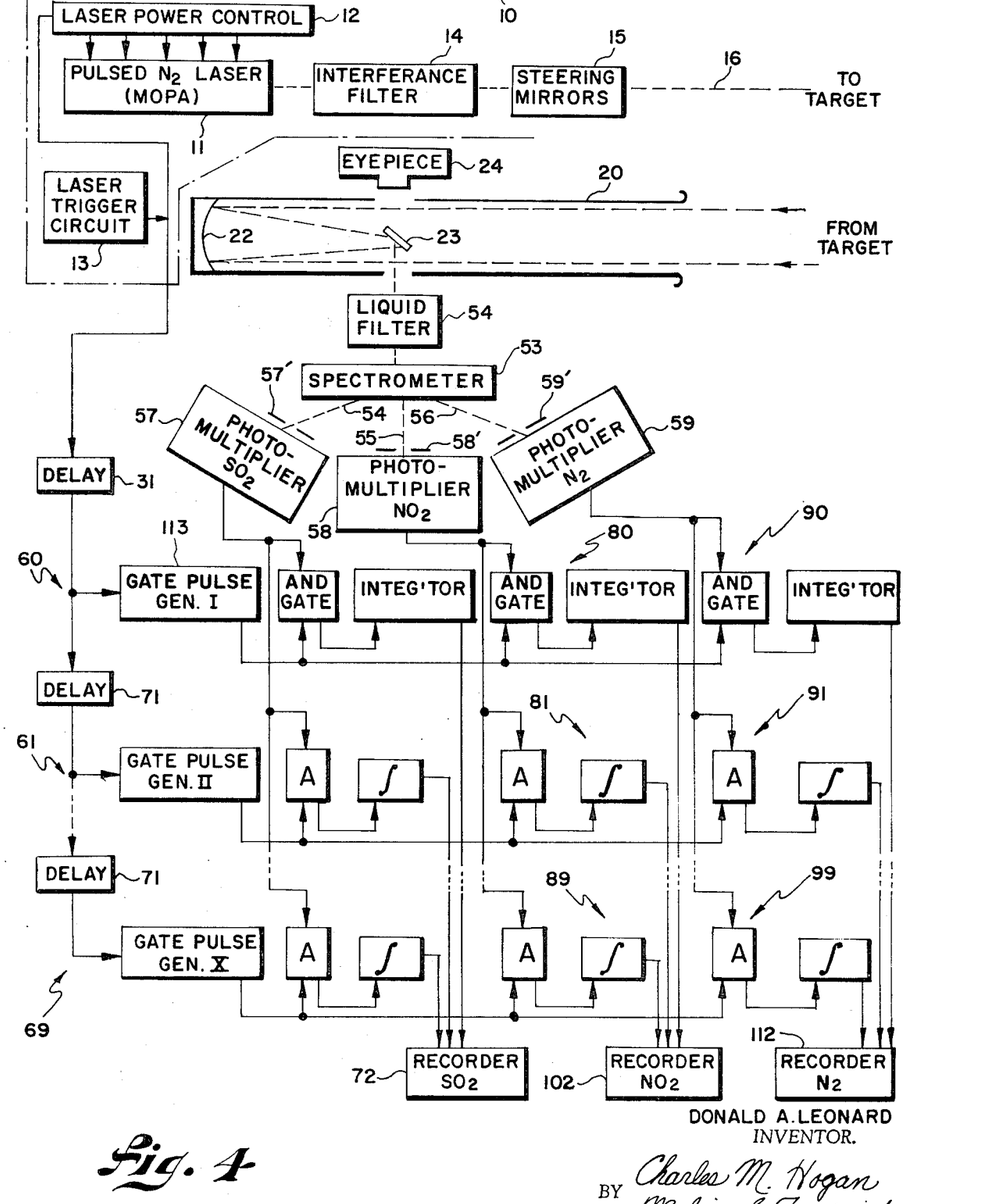
FIG. 4 is a schematic and block diagram of an embodiment for rapidly determining the concentrations of a plurality of gas constituents at a plurality of ranges.

A series of monochrometers feeding a series of photomultipliers in the systems shown in FIGS. 1 and 3 could be used to obtain a Raman scattered return from a number of different gas species such as $SO_2$, $NO_2$ and CO; these being the most serious air pollutants. All these species could be examined as to concentration and range. A separate channel would be required for each gas species responding to the output of the different photomultiplier as in FIG. 1 or a separate bank of channels responding to the output of each photomultiplier would be employed as shown in FIG. 3. It would be an advantage here to examine the gas species $O_2$ or $N_2$ which are present in atmospheric gas effluents in known concentrations. The channel output for the known gas, $O_2$ or $N_2$ would serve as a standard with which to compare the channel outputs for the other gas species. This comparison would yield a measure of the relative concentrations of the unknown gas species to the known. A remote monitoring system incorporating such a standard by which to compare the readings from designated gas species in unknown concentrations is shown in FIG. 4. Here, the transmitter system including the pulsed laser 11, laser power control 12, interference filter 14 and laser beam steering mirrors 15 may be the same as described above with reference to the systems in FIGS. 1 and 3. In the receiver system 21 a Newtonian type telescope 22 intercepts the scattered radiation which is directed by the steering mirror therein to a spectrometer 53. A liquid filter 54 between the spectrometer and the telescope serves the same purpose as the liquid filter 26 in the embodiments in FIGS. 1 and 3 and so may have the same characteristics as illustrated in FIG. 2. The spectrometer 53 separates the Raman scattered radiation according to wavelength and may employ a prism or a diffraction grating to do this. The prism type spectrometer includes an optical system input and output which renders the scattered radiation parallel before entering the prism and focuses the radiation from the prism on spaced slits each identified with a different wavelength and so identified with a different gas species. A radiation from each of the slits is detected by a separate photomultiplier. In a diffraction grating spectrometer, the light from the telescope is rendered parallel and directed to a curved diffraction grating which separates the light by wavelength by directing it to spaced slits which are identified with wavelength and so identify the gas species. The spectrometer 53 illustrated in FIG. 4 represents either of these basic types and so it directs radiation along three separate paths 54, 55, and 56 to the field stops 57', 58' and 59' of photomultipliers 57, 58 and 59, respectively. Thus, the photomultipliers each detect a different wavelength of Raman scattered radiation and so detect scattered radiation from a different gas species. For example, the optical system may be designed so that the photomultipliers 57 to 58 detect scattered radiation from the gas species $SO_2$, $NO_2$ and $N_2$, respectively. The photomultiplier outputs are integrated over pulse intervals which are related to the interval of a laser pulse. For each output a plurality of channels are provided, each channel producing a signal indicative of the concentration of the particular gas species at a particular range. Thus, the output of each photomultiplier is treated by a plurality of range channels such as shown in FIG. 3 and so plume profiles of any particular gas or each of the gas species can be obtained following a single pulse from the laser. For this purpose, the output of photomultiplier 57 which represents the concentration of $SO_2$ at the target range is fed to each of channels 60 to 69. The delay 31 at the input to channel 60 and the delays 71 at the inputs to each of the channels serve to delay the trigger signal from the laser trigger circuit 13 that is fed to the gate pulse generator in each channel and so the gate pulses produced in the successive channels 60 to 69 define the successive ranges just as in the system in FIG. 3. For example, if all the delays are 100 nanoseconds, then the ranges are 50 foot increments.

The channels 60 to 69 may be identical to channels 40 to 49 shown in FIG. 3 and feed signals to the $SO_2$ indicator 72 which indicates the plume profile for $SO_2$ across a designated space.

Similarly, the output of photomultiplier 58 which represents the concentration of $NO_2$ is fed to channels 80 to 89 which control the $NO_2$ recorder 102. The output of photomultiplier 59 which represents the concentration of $N_2$ at a sweep of ranges is fed to channels 90 to 99 which control the $N_2$ recorder 112. The recorded $N_2$ concentrations can serve as a standard because it is generally known in any atmospheric discharge of combustion gases. Since the scattered Raman radiations from the three gas species are sensed simultaneously from substantially the same optical paths (except for the photomultipliers) the signals recorded for the standard gas by the recorder 112 are useful as a calibration of all recorded signals.

The simultaneous measurement with apparatus in accordance with the present invention of $CO_2$, $SO_2$ and NO can be used to unambiguously obtain the ratio of $SO_2$ to $CO_2$ and NO to $CO_2$ independent of the transmitter power, the optical transmission characteristics of the optical path and the plume or the amount of excess diluent air. Thus, by use of the present invention, $SO_2/CO_2$ and $NO/CO_2$ ratios may be easily measured and these ratios used to provide a standard for pollution enforcement, which standard would be as noted above, independent of dilution of effluent or path transmission loss or transmitter power.

Each of the channels 80 to 89 and each of the channels 90 to 99 includes in the channel the gate pulse generator in the corresponding one of channels 60 to 69. Thus, the gate pulse generator 113 in channel 60 which is the input to channel 60 is also the input to channel 80 and to channel 90. Accordingly, channels 60, 80 and 90 all respond to the same range gate and their outputs are indicative of the concentration of their associated gas species at the same given range.

The system in FIG. 4 includes a number of significant features of the invention and these features are related and somewhat interdependent. For example, the scattered radiation for each gas species is detected and integrated only during the brief interval of a range gate pulse following a laser pulse. This reduces the dark current count in the system and also insures detection of the Raman scattered radiation from a selected range. The advantages of the system shown in FIG. 4, as already mentioned, are that separate gas species can be identified at each of the succession of ranges from the laser and the concentration of these gas species at each range can be determined by comparing with equivalent signals received for $N_2$ or other species which is in known concentration. Thus, the system in FIG. 4 enables the profile of a polluting gas effluent to be obtained simultaneously for a number of different gas species by illuminating the effluent with a single laser pulse. In practice, however, more significant output signals from the channels are produced when integration in each channel continues over a number of pulses from the laser. The number of pulses required to produce a reading will depend upon, among other things, laser power, system sensitivity, both optical and electrical, and the concentrations of the gases which it is desired to detect.

Figure 8:
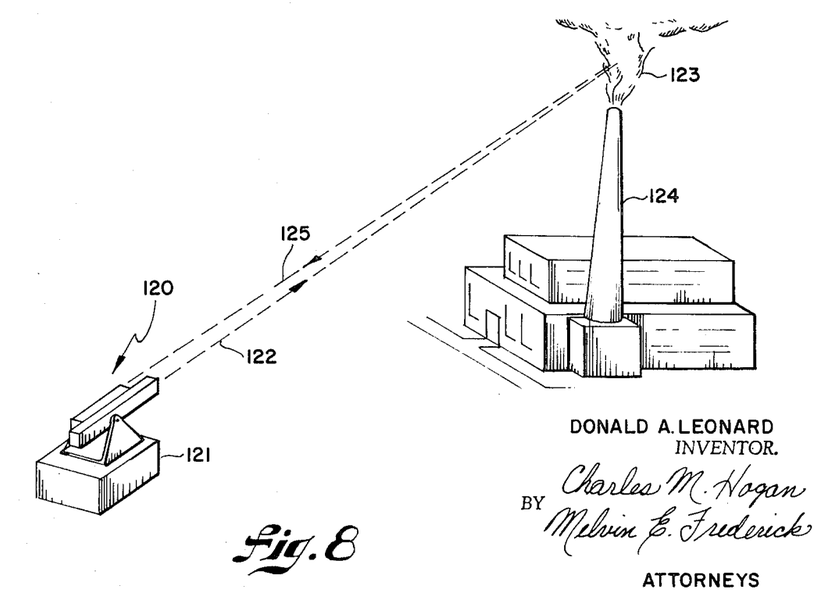
FIG. 8 is a diagram showing the laser transmitter and receiver monitoring polluting effluent at a distant location.

FIG. 8 is a diagram showing the remote laser transmitter and receiver 120 on a pedestal 121 directing transmitted laser radiation 122 to a plume of smoke 123 emitted from a smoke stack 124. Scattered radiation 125 of all kinds returns from the plume to the receiver and is analyzed by the systems such as shown in FIGS. 1, 3 or 4 to determine the constituents, concentrations and range to the plume.

The various embodiments of the present invention as shown and described herein are intended to illustrate the best uses of the invention. These embodiments incorporate various features of the invention in different combinations to examine scattered radiation from a distant gaseous target. The apparatus described in these embodiments aides to determine the gaseous species at the target, the relative concentrations of different gaseous species at the target and the distance to the target. Embodiments are also useful for determining the concentration profile of a given gas species across a smoke plume and for determining this profile simultaneously for a number of different gas species so that the quality profile across the gas plume can be determined. The range information enables the location of an air pollution source to be determined. Variations of the embodiments of the invention described herein are included within the scope of the invention as set forth in the appended claims.

What is claimed is:

1. In a detection system, the combination comprising:
   a. a source of intense monochromatic radiation at 3,371 A which is directed to a target, said radiation being in the ultraviolet range;
   b. trigger circuit means for actuating said monochromatic radiation source in a pulsed mode;

c. first means for detecting Raman scattered radiation of different wavelengths which is scattered from said target due to the incident intense monochromatic radiation, said first means comprising radiation separation spectrometer means for receiving and separating Raman scattered radiation of different wavelengths and photomultiplier means for receiving said separated Raman scattered radiation and producing a separate electrical signal in response to each said separated Raman scattered radiation;

d. a plurality of sets of integrator means, each said set receiving and integrating one of said electrical signal and providing a plurality of separate output signals for each said separate electrical signal;

e. AND gate circuit means coupled to each integrator means for coupling its integrator means to one of said electrical signals;

f. means including gate pulse generator means actuated by said trigger circuit means and coupled to said AND circuit means for controlling the interval of integration of said integrator means, the interval of integration of one each of said integrator means of each said set of integrator means being simultaneously controlled by a different gate pulse generator means, the controlled interval provided by each gate pulse generator means being differently spaced in time relative to said pulses of said source;

g. indicator means for separately receiving and indicating the magnitude of the said output signals of each of said sets of integrator means; and h. a radiation filter in the path between the target and said first means which transmits said Raman scattered radiation of different wavelengths to said first means and blocks radiation of the same wavelength as the radiation from the source from reaching said first means, said filter including a water solution of 2,7 - dimethyl, 3,6 - diazacyclohepta, and 1,6 - diene perchlorate having substantially complete isotropic volume bulk absorption at the wavelength of said radiation and only small absorption of wavelengths of about 3,500 A and longer.

2. The combination as in claim 1 and additionally including delay means actuated by said trigger circuit means for actuating said gate pulse generator means whereby each controlled interval of integration is differently spaced in time relative to a pulse of said source radiation by an interval indicative of the range from the source to the target.

3. The combination as in claim 1 and additionally including delay means actuated by said trigger circuit means for actuating said gate pulse generator means whereby each controlled interval of integration is differently spaced in time relative to a pulse of said source radiation by an interval indicative of the range from the source of the target, and the outputs of said integrating means represent the relative concentrations of different gas species at specific ranges from the source.

* * * * *